Dec. 15, 1959  J. B. GILL  2,916,955
PIPE MACHINING TOOL
Filed June 22, 1956
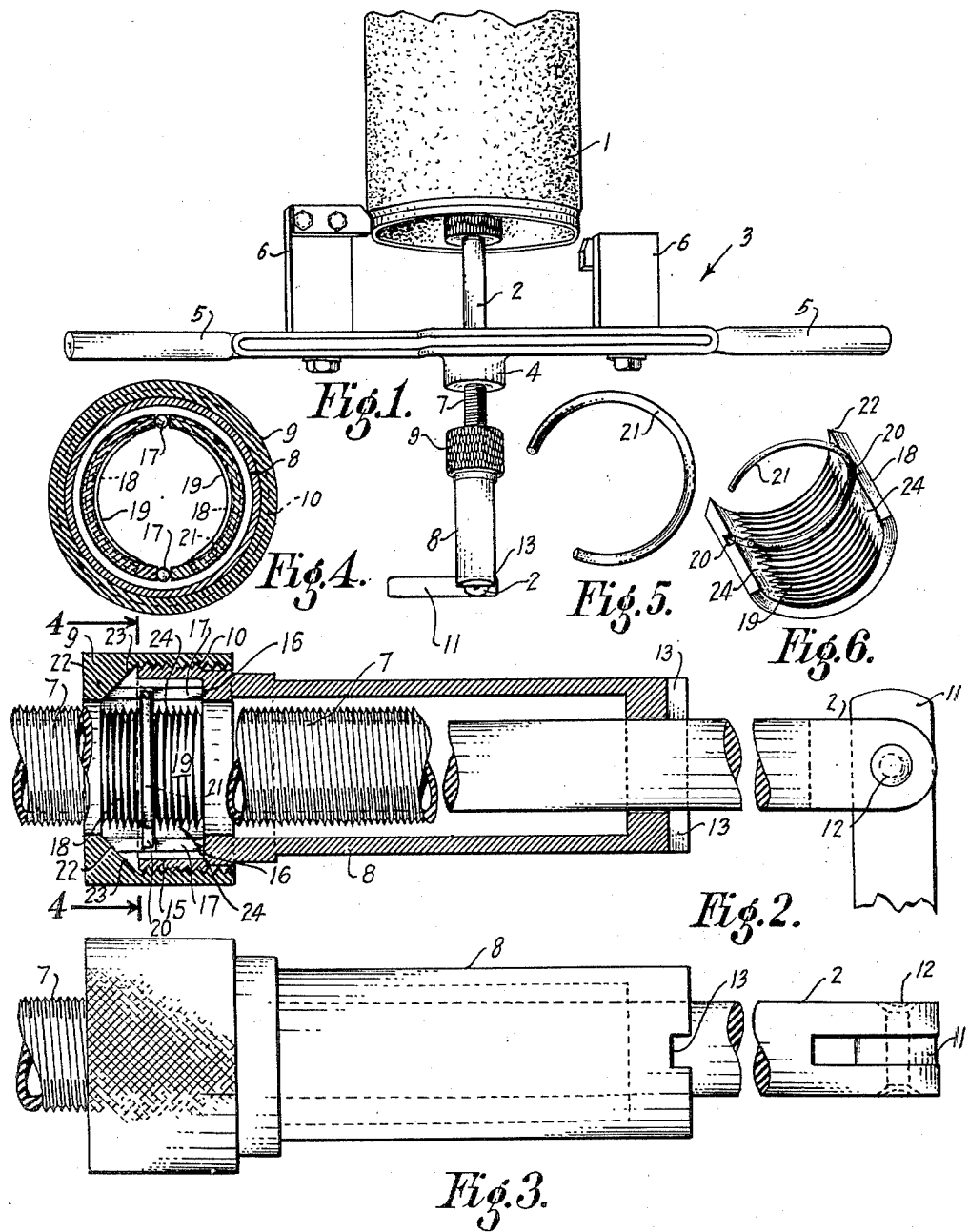
INVENTOR.
John B. Gill.
BY
A. Schapp,
ATTORNEY

United States Patent Office 2,916,955
Patented Dec. 15, 1959

2,916,955

PIPE MACHINING TOOL

John B. Gill, Torrance, Calif.

Application June 22, 1956, Serial No. 593,269

3 Claims. (Cl. 82—4)

The present invention relates to improvements in a pipe machining tool, and has particular reference to a tool for machining a tapered or cylindrical finish on the end of an asbestos cement pipe.

My tool comprises in its principal features a shaft having means for anchoring the same to the inside of the pipe and a cutter head revolvable on the shaft, with threaded means for feeding the cutter head, and the present invention contemplates certain improvements over the machining tool described in United States Patent No. 2,607,376.

The principal object of the present invention is to provide a threaded mounting for the cutter head, so that when the cutter head is revolved it automatically advances toward the work, with less effort on the part of the operator and greater accuracy in the progress of the work.

It is further proposed to provide a releasable screw feed for the cutter head so that the latter may be advanced or retracted by straight sliding movement for assembling and adjusting operations, and may be readily changed to a screw drive for working operations.

Further objects and advantages of my pipe machining tool will appear as the specification proceeds, and the new and useful features of the same will be fully defined in the claims attached hereto.

The preferred form of my invention is illustrated in the accompanying drawing, forming part of this application, in which:

Figure 1 shows a perspective view, taken from above, of my entire tool as applied to an asbestos cement pipe;

Figure 2, an axial section through a releasable screw feed forming part of my invention, portions being broken away;

Figure 3, a side view of the same;

Figure 4, a section taken along line 4—4 of Figure 2;

Figure 5, a perspective detail view of a spring ring used in the releasable screw feed; and Figure 6, a perspective detail view of an internally threaded segment forming part of the screw feed, with an expansion spring attached thereto.

While I have shown only the preferred form of my invention, it should be understood that various changes or modifications may be made within the scope of the claims hereto attached, without departing from the spirit of the invention.

Referring to the drawing in detail, Figure 1 shows my pipe machining tool in operative position with respect to a pipe 1. The machine is mounted on a shaft 2 extending through the length of the tool and provided, at its front end, with an anchoring means for anchoring the same to the inside of the pipe so that the shaft projects outside the pipe in axial alinement therewith.

The anchoring means is fully described in the above-mentioned United States Patent No. 2,607,376, and is not shown in the present drawing.

A cutter head 3 is revolvable on the shaft 2, and is of substantially the same construction, except for the changes to be noted, as the cutter head shown in the patent. It comprises in its general features, a hub 4 revolvable on the shaft, with two arms 5 extending laterally therefrom, each arm carrying a cutter 6 with cutter blades positioned to machine the outside of the outer end of the pipe in the manner shown, as the cutter head is rotated under forward pressure.

The cutter head has a central, outwardly threaded tube 7 projecting rearwardly from its hub, this tube being of considerable length, at least equal to the length of the deepest cut to be made, and is slidable and revolvable on the shaft 2.

A sleeve 8 is also slidable and revolvable on the shaft rearwardly of the tube 7, and its front end has a collar 9 threaded thereon, as at 10, this collar serving to establish and release threaded connection between the tube 7 and the sleeve 8.

The sleeve 8 may be locked against rotary movement on the shaft by means of a handle 11 pivoted to the extreme rear end of the shaft, as at 12. This handle may be swung into a position of alinement with the shaft, and in this position merely serves as an extension of the shaft, being dimensioned to allow the entire assembly including the entire head and the sleeve, to freely pass thereover.

But, when the handle is in transverse position, the sleeve and the cutter head may be backed up against the same, with a pair of slots 13 in the end of the sleeve engaging over the upper edge of the handle, whereby the sleeve is locked against rotary movement, as well as against rearward movement.

The handle, being secured upon the shaft, which in turn is anchored to the pipe, thus takes the rearward thrust of the screw drive for the cutter head.

For the purpose of the releasable screw drive between the tube 7 and the sleeve 8, the latter is formed, at its forward end, with an enlargement 15 forming an inner shoulder 16. The collar 9, threaded on the enlargement, as at 10, thus forms an annular chamber therewith, and the collar and the sleeve are normally slidable on the threaded tube 7.

The shoulder 16 has two posts 17 projecting therefrom in parallel and diametrically opposed relation and so as to clear the threads on the tube. Between the posts, and separated thereby, I provide two complementary segments 18, each segment having an inner thread 19 fitting the thread of the tube 7 and an outer circumference concentric with the thread.

The two segments 18 ride on the shoulder 16, and the thickness of the segments is such that they are free to move on the shoulder 16 between active positions of engagement with the thread of the tube 7 and inactive position against the wall of the enlargement 15, where they clear the thread of the tube.

The two segments are formed, immediately outside the posts 17, with registering annular grooves 20 adapted to receive a split expansion ring 21 which tends to crowd the segments apart and into inactive position.

The segments are of sufficient length to extend forwardly beyond the sleeve enlargement and the projecting ends are formed with an outer taper, as at 22.

The inner end of the collar 9 is formed with a corresponding taper 23, and the various parts are dimensioned in such a manner that when the collar is threaded upon the enlargement, toward the very end of the movement, the taper of the collar engages the tapers of the segment and crowds the segments inward and into threaded engagement with the tube 7.

Thus, engagement may be effected by a slight turning movement of the collar toward the end of its travel, and release may be effected by a slight turning movement in the opposite direction.

The threads on the segments are foreshortened at the sides to leave blank spaces 24. This is made necessary since in view of the short segment movement contemplated, the ends of the threads, if carried clear through to the edges of the segments, would not clear the tube thread.

When the segments are in inactive position, they are spaced from the posts 17, but when the collar is turned to crowd the segments inward, the latter move in on the posts and at the end of the engaging movement, the segments bear firmly upon the posts to form a rigid annular unit therewith, for properly positioning the segments with respect to the tube thread.

In operation:

The shaft 2 may first be anchored to the pipe in the manner shown in the patent referred to, with the handle 11 in extended position.

Next, the cutter head 3 may be pushed over the shaft from the rear end thereof, to the position shown in Figure 1, with the threaded tube 7 projecting rearwardly. Thereupon, the sleeve assembly 8—9, with the segments in inactive position is made to slide over the tube 7 until its rear end clears the handle 11, which is then turned into transverse position.

The sleeve is then pulled backward for anchoring against the handle, and, with the cutter head adjusted to correct starting position, the collar 9 is given a final turning twist for forcing the segments into threaded engagement with the tube 7.

Now, when the cutter head is turned, the tube 7, working against the segments, will automatically feed the cutter head toward the pipe, the thrust being taken by the handle 11, which in turn is anchored to the pipe by means of the shaft 2.

I claim:

1. In a tool for machining pipe, a shaft adapted for mounting in a pipe end, a cutter head having pipe engaging cutters projecting from one side, a tube fixed to and projecting from the opposite side of said cutter head and journaled for rotatable and axial movement on said shaft so as to bring said cutters into cutting engagement with the periphery of the pipe end, said tube being formed with external threads, a sleeve slidable and revolvable on said shaft and having a releasable threaded connection with said tube internally of said sleeve whereby said threaded connection will be protected from debris cut from the pipe by said cutters, and a thrust means on said shaft for engaging and locking said sleeve against rotary and sliding motion on said shaft in a direction away from the pipe whereby revolving of said cutter head will cause said threaded connection to advance said tube and cutter head toward the pipe, said thrust means being selectively movable out of engagement with said sleeve so as to allow said cutter head and sleeve to be removed from said shaft.

2. In a tool for machining pipe, a shaft adapted for mounting in a pipe end, a cutter head having pipe engaging cutters projecting from one side, a tube fixed to and projecting from the opposite side of said cutter head and journaled for rotatable and axial movement on said shaft so as to bring said cutters into cutting engagement with the periphery of the pipe end, said tube being formed with external threads, a sleeve slidable and revolvable on said shaft and having a releasable threaded connection with said tube internally of said sleeve whereby said threaded connection will be protected from debris cut from the pipe by the cutters, and thrust means on said shaft for engaging and locking said sleeve against rotary and sliding motion on said shaft in a direction away from the pipe whereby revolving of said cutter head will cause said threaded connection to advance said tube and cutter head toward the pipe, said thrust means being selectively movable out of engagement with said sleeve so as to allow said cutter head and sleeve to be removed from said shaft, said thrust means comprising a handle pivoted to said shaft and movable between transverse and aligned positions, said sleeve having its end confronting said handle formed for interengagement therewith when the handle is in said transverse position, and said handle being proportioned to lie within the area of an imaginary extension of said shaft when in said aligned position whereby said sleeve and said cutter head may be removed from said shaft over said handle when the latter is in said aligned position.

3. In a tool for machining pipe, a shaft adapted for mounting in a pipe end, a cutter head having pipe engaging cutters projecting from one side, a tube fixed to and projecting from the opposite side of said cutter head and journaled for rotatable and axial movement on said shaft so as to bring said cutters into cutting engagement with the periphery of the pipe end, said tube being formed with external threads, a sleeve slidable and revolvable on said shaft and having a releasable threaded connection with said tube internally of said sleeve whereby said threaded connection will be protected from debris cut from the pipe by the cutters, said sleeve having its ends confronting said cutter head formed with a counterbore providing an inside shoulder, a pair of semi-cylindrical segments formed with internal threads corresponding to the external threads of said tube and mounted in said counterbore abutting said shoulder, said segments having tapered ends projecting outside said sleeve, spring means normally urging said segments apart so as to clear the threads on said tube, means securing said segments against rotation relative to said sleeve, a collar threaded on the counterbored end of said sleeve and having a conical inner shoulder closely surrounding said tube and adapted for bearing on said tapered ends of said segments for urging the threads of the same into engagement with the threads of said tube when the collar is screwed tightly upon the sleeve and thrust means on said shaft for engaging and locking said sleeve against rotary and sliding motion on said shaft in a direction away from the pipe whereby revolving of said cutter head will cause said threaded connection to advance said tube and cutter head toward the pipe, said thrust means being selectively movable out of engagement with said sleeve so as to allow said cutter head and sleeve to be removed from said shaft.

References Cited in the file of this patent

UNITED STATES PATENTS

| | | |
|---|---|---|
| 725,779 | Schellenbach | Apr. 21, 1903 |
| 1,317,735 | Skelly | Oct. 7, 1919 |
| 2,409,158 | Simpson | Oct. 8, 1946 |
| 2,607,376 | Montgomery | Aug. 19, 1952 |
| 2,687,317 | Capra | Aug. 24, 1954 |
| 2,705,605 | Kreissig | Apr. 5, 1955 |
| 2,705,983 | Guadanga | Apr. 12, 1955 |
| 2,746,497 | Thompson | May 22, 1956 |
| 2,769,991 | Laemmel | Nov. 13, 1956 |

FOREIGN PATENTS

| | | |
|---|---|---|
| 25,235 | Finland | Feb. 6, 1952 |
| 464,570 | Canada | Apr. 25, 1950 |
| 622,595 | France | Feb. 28, 1927 |